(12) United States Patent
Gould

(10) Patent No.: US 12,401,918 B2
(45) Date of Patent: Aug. 26, 2025

(54) VEHICLE IMAGING STATION

(71) Applicant: DEGOULD LIMITED, Exeter (GB)

(72) Inventor: Daniel George Gould, Exeter (GB)

(73) Assignee: DEGOULD LIMITED (GB)

(*) Notice: Subject to any disclaimer, the term of this patent is extended or adjusted under 35 U.S.C. 154(b) by 208 days.

(21) Appl. No.: 17/633,372

(22) PCT Filed: Aug. 3, 2020

(86) PCT No.: PCT/GB2020/051860
§ 371 (c)(1),
(2) Date: Feb. 7, 2022

(87) PCT Pub. No.: WO2021/028653
PCT Pub. Date: Feb. 18, 2021

(65) Prior Publication Data
US 2022/0294994 A1    Sep. 15, 2022

(30) Foreign Application Priority Data
Aug. 9, 2019 (GB) .................................. 1911441.2

(51) Int. Cl.
*H04N 23/90* (2023.01)
*G01N 21/88* (2006.01)
(Continued)

(52) U.S. Cl.
CPC ............ *H04N 23/90* (2023.01); *G01N 21/88* (2013.01); *H04N 7/18* (2013.01); *H04N 23/56* (2023.01); *H04N 23/66* (2023.01); *H04N 23/84* (2023.01)

(58) Field of Classification Search
CPC ............ H04N 23/90; H04N 7/18; H04N 9/64; H04N 23/56; H04N 23/66; G01N 21/88;
(Continued)

(56) References Cited

U.S. PATENT DOCUMENTS 5,636,024 A * 6/1997 Crookham ........... G01M 11/005
356/613
5,726,705 A    3/1998 Imanishi
(Continued)

FOREIGN PATENT DOCUMENTS

CN        102159918 A    8/2011
DE          3418317 C1    1/1985
(Continued)

OTHER PUBLICATIONS

European Patent Office, Article 94(3) EPC Examination Report issued May 30, 2023 which pertains to EP Application No. 20751565.8, 4 pages.
(Continued)

*Primary Examiner* — Nathan J Flynn
*Assistant Examiner* — Christine A Kurien
(74) *Attorney, Agent, or Firm* — Thompson Hine LLP

(57) ABSTRACT

A vehicle imaging station for capturing images of scratches and dents on a vehicle, the vehicle imaging station including a tunnel having an entrance and an exit, and a structured light source. The station has a first camera arranged with a field of view comprising/containing/encompassing a structured light portion of the tunnel volume in which the structured light image will be reflected to be visible to the first camera by a vehicle moving along the vehicle pathway, and a second camera arranged with a field of view comprising a non-structured light portion of the tunnel volume in which the structured light image will not be reflected to be visible to the second camera when a vehicle moves along the vehicle pathway. The station also includes a non-reflective, non-illuminating surface within the tunnel on a same side of the central axis of the vehicle pathway as the second camera.

22 Claims, 4 Drawing Sheets

(51) Int. Cl.
  *H04N 7/18* (2006.01)
  *H04N 23/56* (2023.01)
  *H04N 23/66* (2023.01)
  *H04N 23/84* (2023.01)
(58) Field of Classification Search
  CPC ....... G01N 2021/8829; G01N 21/8806; G01N 21/8851; G01B 11/25; G01B 2210/52; G01B 5/0025; G01B 11/30
  See application file for complete search history.

(56) References Cited

U.S. PATENT DOCUMENTS

| | | | |
|---|---|---|---|
| 9,103,671 B1* | 8/2015 | Breed | G01S 13/865 |
| 11,021,885 B2* | 6/2021 | Williams | G01B 11/167 |
| 2016/0100087 A1 | 4/2016 | Scheich | |
| 2018/0012350 A1 | 1/2018 | Gangitano | |
| 2018/0160019 A1* | 6/2018 | Scheich | H04N 23/74 |

FOREIGN PATENT DOCUMENTS

| | | |
|---|---|---|
| DE | 19839882 A1 | 4/2000 |
| DE | 102016010833 A1 | 3/2017 |
| JP | 2000009454 A | 1/2000 |
| JP | 2015184143 A | 10/2015 |
| WO | 2018233780 A1 | 12/2018 |
| WO | 2019/122701 A1 | 6/2019 |
| WO | 2019/147390 A2 | 8/2019 |

OTHER PUBLICATIONS (PCT) European Patent Office (ISA/EP), International Search Report and Written Opinion of the International Searching Authority, International Application No. PCT/GB2020/051860, 14 pages, Oct. 28, 2020.
(GB) Intellectual Property Office, Combined Search and Examination Report, Application No. GB1911441.2, 6 pages, Oct. 3, 2019.
European Patent Office, Communication pursuant to Article 94(3) EPC Examination Report issued Jun. 6, 2024, which pertains to EP Patent Application No. 20751656.8. 4 pgs.
China National Intellectual Property Administration, First Office Action (with English translation), Chinese Patent Application No. 202080068185.3, 39 pages, Jul. 16, 2024.
China National Intellectual Property Administration, Second Office Action (with English translation), Chinese Patent Application No. 202080068185.3, 30 pages, Jan. 10, 2025.
Korean Intellectual Property Office, Office Action (with English translation), Korean Patent Application No. 10-2022-7007813, 5 pages, Mar. 28, 2025.
Japan Patent Office, Office Action (with English translation), Japanese Patent Application No. 2022-534484, 6 pages, Jul. 31, 2024.
China National Intellectual Property Administration, Chinese Rejection issued May 7, 2025, which pertains to Chinese Patent Application No. 202080068185.3. 32 pages.
European Patent Office, European Examination Report issued May 13, 2025, which pertains to European Patent Application No. 20751656.8. 4 pages.

* cited by examiner

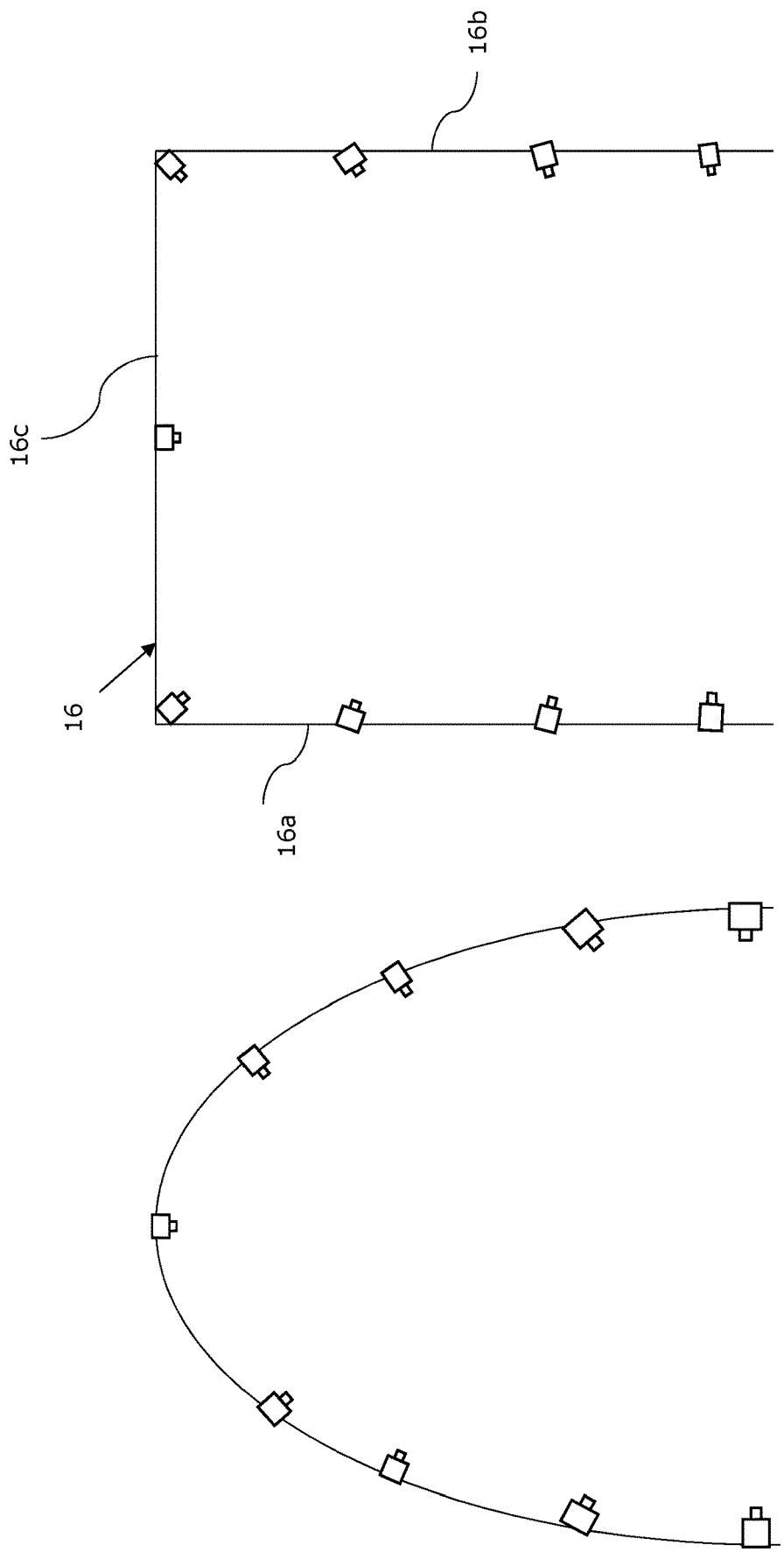

VEHICLE IMAGING STATION

This application is a national stage filing of International (PCT) Application No. PCT/GB2020/051860, filed on Aug. 3, 2020 (corresponding to International Publication No. WO 2021/028653), which in turn claims priority to GB Application No. 1911441.2, filed on Aug. 9, 2019. The entire contents of those applications are incorporated by reference herein.

BACKGROUND

Over time vehicles may suffer external damage, such as scratches and dents, or structural damage.

The present inventor has identified that existing vehicle imaging stations can have a large mechanical footprint and/or be time consuming and use and/or not be capable of imaging both scratches and dents in a single process.

SUMMARY

In accordance with a first aspect of the present invention, there is provided a vehicle imaging station for capturing images of scratches and dents on a vehicle, the vehicle imaging station comprising:

- a tunnel having an entrance and an exit with one or more walls defining an enclosure between the entrance and exit to define a tunnel volume containing a vehicle pathway having a central axis;
- a structured light source arranged to direct structured light at the vehicle pathway for illuminating a vehicle on the pathway with a structured light image;
- a first camera arranged with a field of view comprising, containing and/or encompassing a structured light portion of the tunnel volume in which the structured light image will be reflected to be visible to the first camera by a vehicle moving along the vehicle pathway;
- a second camera arranged with a field of view comprising, containing and/or encompassing a non-structured light portion of the tunnel volume in which the structured light image will not be reflected to be visible to the second camera when a vehicle moves along the vehicle pathway; and
- a non-reflective, non-illuminating surface within the tunnel on a same side of the central axis of the vehicle pathway as the second camera.

The present inventor has found that a vehicle imaging station according to the first aspect of the invention enables the detection of dents and scratches on a vehicle, in a single pass with a high degree of accuracy. The tunnel controls the amount of light noise appearing in images captured by the cameras. The structured light image generated by the structured light source enables the first camera to serve as a dent detection camera, where an observed deviation from the expected structure pattern due to a known profile of the vehicle is indicative of a dent. The structured pattern can for example be a series of parallel strips of light. The second camera serves as a scratch detection camera and is orientated to observe a non-structured light portion of the tunnel volume, in which the second camera cannot see a direct reflection of the structured light source, which could otherwise adversely affect the ability to observe scratches on the vehicle. The present inventor has found that the presence of the non-reflective, non-illuminating surface within the tunnel results in scratches being clearly visible, even when the only light source within the tunnel is the structured light source. The non-reflective, non-illuminating surface can be any surface that scatters more light than it reflects and is not a light source.

The second camera can be orientated such that the structured light portion of the tunnel volume is not visible anywhere within the field of view of the second camera.

The first and second cameras can be arranged such that the field of view of the second camera does not overlap with the field of view of the first camera.

The first and second cameras can be mounted between the non-reflective, non-illuminating surface and the structured light source.

The first camera can be angled away from the second camera, such that it points more away that towards the second camera.

The non-reflective, non-illuminating surface can be a plain surface for example a substantially non-patterned surface. This can provide a blank reflection image to the second camera in which scratches on the vehicle are easily observable.

The non-reflective, non-illuminating surface can be planar or flat.

The first and second camera can define a first camera pair, arranged together to enable scratch and dent detection of a region of a vehicle, such as the top, a side, a portion thereof for example.

The imaging station can comprise one or more further camera pairs, at least one of which can be mounted on the opposite side of the central axis of the vehicle pathway in comparison to the first pair and/or one of which can be mounted on a roof surface of the tunnel facing the vehicle pathway in order to capture images of the roof. A series of more than five camera pairs can be mounted in a series around the tunnel.

The imaging station can comprise one or more further light sources, not directly visible to the first or second cameras in reflection via the vehicle. Such a light source can help to further illuminate the vehicle without affecting the ability to observe dents or scratches.

The side walls and roof can be generally planar or flat, with the roof extending orthogonally to the side walls to create a rectangular cross section tunnel. Alternatively, the tunnel can have an arc shaped or otherwise curved cross section.

The ends of the side wall(s) can define the opening and exit i.e. the opening and exit can have roughly the same cross sectional area as other portions of the tunnel.

The ends of the side wall(s) can extend inwardly towards one another to define angled end wall portions which define the entrance and exit. This arrangement can enable the middle portion of the tunnel to have a relatively large cross sectional area for containing equipment, while the area of the entrance and exit is each relatively small to control the amount of light that can enter the tunnel.

Where angled end wall portions are provided, the structured light source can be mounted on or adjacent the internal surface(s) of the angled end wall portions. This can reduce the likelihood of a driver of the vehicle seeing the structured light image as the vehicle enters the tunnel.

The entrance can be distinct from the exit, resulting in a linear vehicle pathway between the entrance and exit. The entrance and exit can be aligned. The linear pathway can be a straight line for ease of passage.

The imaging station can comprise one or more, further cameras arranged to capture images of the front and/or rear of the vehicle, the underbody and/or the wheels or tires. This can enable the number plate to be captured by the system and/or the condition of wheels, tires and the underbody to be recorded.

The imaging station can comprise a data processor or controller such as a general purpose computer, application specific integrated circuit or the like, arranged to receive inputs from the cameras and store them in computer memory and/or transmit them to a remote device.

The controller can execute a program arranged to trigger the cameras. The controller can be arranged to trigger cameras in response to criteria such as input from one or more sensors and/or temporal conditions having been met.

The imaging station can comprise one or more sensors coupled to the controller. The imaging station can for example comprise: a sound transducer such as a microphone arranged to detect engine noise; a proximity sensor arranged to detect a vehicle approaching the opening; and/or a vehicle speed sensor that the controller can use to synchronize cameras for stitching images together to form a continuous image of some or all of the vehicle or for adjusting camera settings such as shutter speed.

The controller can execute a program to perform color matching to adjust camera settings for vehicle color.

BRIEF DESCRIPTION OF THE DRAWINGS

By way of example only, certain embodiments of the invention will now be described by reference to the accompanying drawings, in which:

FIG. 1B is a diagram illustrating the cross sectional profile of the tunnel of FIG. 1A;

FIG. 1C is a diagram illustrating an alternative tunnel cross section;

DETAILED DESCRIPTION

Figure 1A:
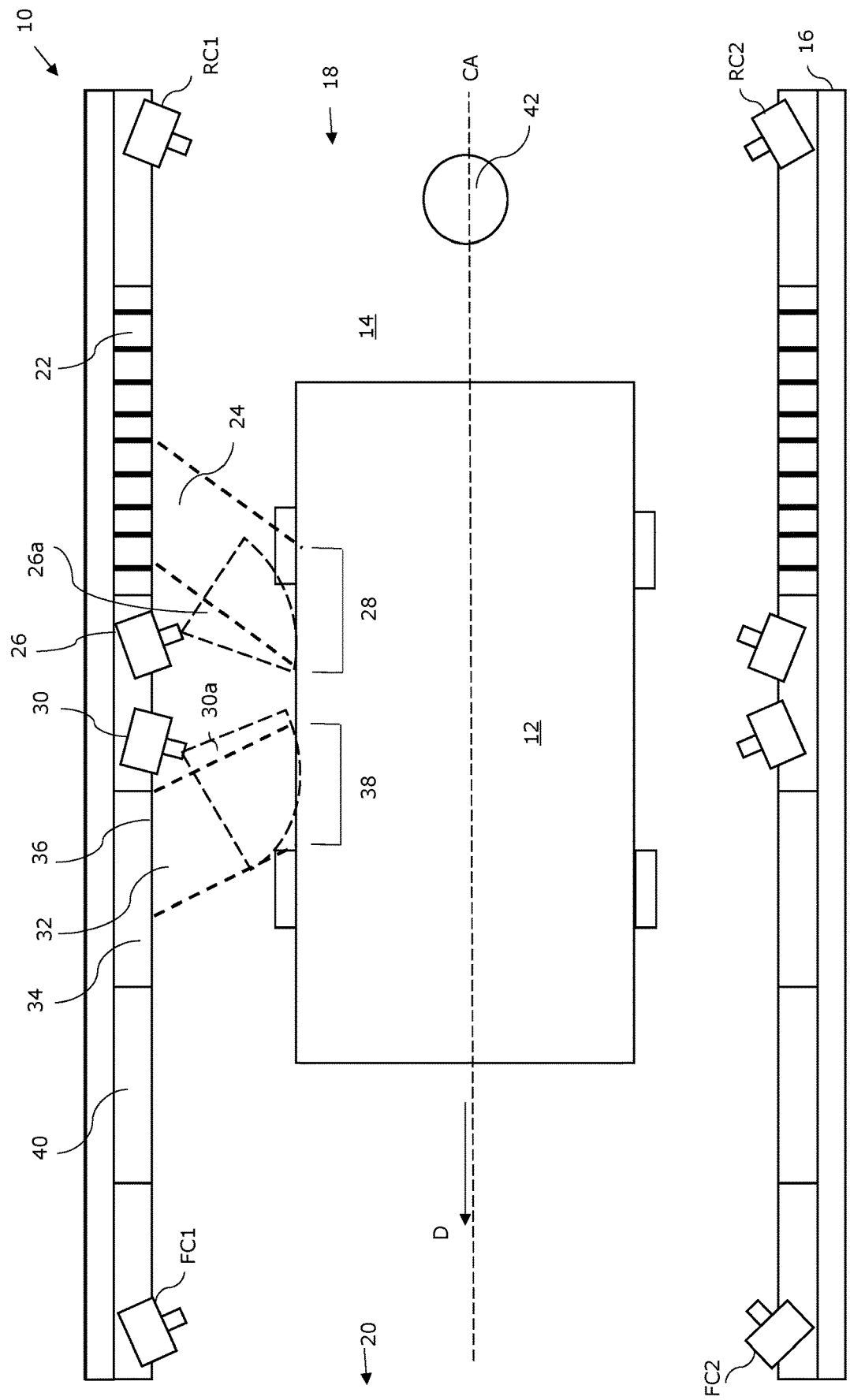
FIG. 1A is a diagram illustrating a vehicle imagining station according to an embodiment of the invention.

Referring to FIGS. 1A and 1B, a vehicle imaging station according to an embodiment of the invention is shown generally at 10. The vehicle imaging station 10 is arranged to take images of a vehicle 12 that can be used to identify damage in the form of scratches and dents on outer panels or other surfaces of the vehicle.

The vehicle imaging station 10 is arranged around a vehicle pathway 14, which can be any path suitable for the vehicle 12 to travel along in a direction D. The pathway 14 is a straight, linear pathway in the illustrated embodiment, but in other embodiments can take any form.

The vehicle imaging station 10 comprises a tunnel 16 arranged so that the vehicle pathway 14 runs through it. In this embodiment the tunnel has two generally planar side wall sections 16a, 16b that are joined at the top by an orthogonally extending, generally planar roof 16c to form a single structure. However, in other embodiments the tunnel can have any suitable cross sectional shape, such as the arch shown in FIG. 1C to which reference should additionally be made.

The tunnel has an entrance 18 and an exit 20 via which the vehicle can enter and exit the tunnel. In this embodiment the entrance and exit are situated at opposite end of the tunnel to define a linear vehicle pathway having a central axis CA. However, in other embodiments the tunnel can have any suitable shape and can have any number of entrances and/or exits, in some cases just a single opening that serves as both an entrance and an exit.

The inventor has recognized that it can be difficult to perceive both vehicle bodywork dents and scratches under the same lighting conditions. The inventor has devised an arrangement that enables both scratches and dents to be imaged in a single stage process, in some cases using a single light source, thus providing an imaging station occupying a relatively small mechanical footprint that can be used to quickly and accurately record damage to a vehicle.

The tunnel includes a structured light source 22 arranged to direct structured light 24 at the vehicle pathway 14 for illuminating the vehicle 12 on the pathway 14 with a structured light image (not shown). In this embodiment the structured light source 22 extends up one side wall 16a from the vehicle pathway 14, across the roof section 16c and down the opposite side wall 16b, back to the vehicle pathway 14 to form an arch of structured lighting. This arrangement enables the structured light image to be projected onto both sides, and the roof, of the vehicle 12 as it passes the structured light source 22. The structured light source 22 is a light array having a set of LED strips arranged in parallel. The LED strips extend along each light array, from the bottom to the top and across the roof section. LEDs can for example be ultrabright cool white LED tape, with a luminosity of 2880 lumens per meter. In one example a set of twenty LED strips can be arranged into 14.2 mm wide grooves spaced 16 mm apart and set 9 mm deep with a 10 mm backing behind them. Semi opaque frosted diffusers (not shown) can be provided over each strip of LEDs to create a flat light from each strip of tape.

In other embodiment the structured light source 22 can have any suitable configuration arranged to project the structured light image onto one or more surfaces and in some cases all outer surfaces of the vehicle; for example, each light source can include a laser projector configured to project one or more light patterns.

The vehicle imaging station 10 includes cameras of a first type 26, namely high speed 'dent detecting' cameras arranged to image dents on the vehicle.

Multiple dent cameras 26 can be arranged inside the tunnel 16, located on the side walls 16a, 16b and roof 16c to form an arch, as shown in FIG. 1B, so that the sides and roof of the vehicle 12 can be simultaneously imaged.

Each dent detecting camera 26 is arranged with a field of view 26a comprising a structured light portion of the tunnel volume in which the structured light image will be reflected to be visible to the first camera 26 by a vehicle 12 moving along the vehicle pathway 14. Thus, the dent detecting cameras 26 are located in the tunnel 16 so that the dent camera field of view 26a overlaps with the striped pattern reflecting on the vehicle. The system can be calibrated for an average or expected vehicle profile for example.

Should the vehicle 12 have a dent in the bodywork, the striped reflections will distort around the dent, for example creating a circle like shape in the reflection. The images captured by the dent detection cameras 26 can then be used retrospectively to analyze whether a vehicle 12 has dents at a certain point in time. Thus, the field of view of the dent detecting cameras 26a overlap the reflected striped image area 28 on the vehicle 12.

In addition to dent detecting cameras 26, the tunnel 16 includes a second camera type 30, namely scratch detecting cameras.

Multiple scratch detecting cameras 30 can be arranged inside the tunnel 16, located on the side walls 16a, 16b and roof 16c to form an arch, as shown in FIG. 1B, so that the sides and roof of the vehicle 12 can be simultaneously imaged.

Each scratch detecting camera 30 is arranged with a field of view 30a which includes a non-structured light portion 32 of the tunnel volume in which the structured light image will not be reflected to be visible to the second camera 30 when a vehicle 12 moves along the vehicle pathway 14. Thus, the field of view of the scratch detecting cameras 30 include at least a portion that does not overlap the reflected striped image area 28 on the vehicle 12. In one case the entire field of view of the scratch detecting cameras 30a does not at all overlap the reflected striped image area 28 on the vehicle 12, as this can increase the amount of vehicle bodywork upon which scratches can be detected.

The dent and scratch cameras 26, 30 can be arranged to form camera pairs, which sequentially observe the same portion of the vehicle 12 as it moves along the pathway 14. The imaging station 10 can therefore include multiple pairs of cameras at several locations around the tunnel 16. In one case, at least one of the further camera pair is located on the opposite side of the central axis CA in comparison to the first pair and/or located on the roof surface 16c of the tunnel 16 facing the vehicle pathway 14. The field of view of the scratch detecting camera 30a does not overlap with the field of view of the dent detecting camera 26a.

A non-structured light source 34 can be provided to assist the scratch cameras 30 to image scratches on the vehicle 12. The inventor has recognized that instead of providing a distinct light source for each type of camera, the striped lighting 24 reflected from the vehicle 12 can be scattered by a plain, non-reflective, non-illuminating surface 36 within the tunnel on a same side of the central axis CA of the vehicle pathway 14 as the second camera 30. For example, the non-reflective, non-illuminating surface 36 can be a non-patterned, matte, white surface.

The non-reflective, non-illuminating surface 36 can form an arch in the tunnel 16, extending from the vehicle pathway 14, towards the roof 16c of the tunnel 16, across the roof 16c of the tunnel 16 and down to the vehicle pathway 14 on the opposite side wall 16a, 16b.

The striped lighting 24 can reflect onto the non-reflective, non-illuminating surface 36 which can scatter the structured light to direct scattered, non-structured light back onto the vehicle 12. This can provide a non-structured lighting area 38 on the vehicle 12 which illuminates the vehicle 12 so that the scratch detecting cameras 30 can accurately image scratches.

The scratch cameras 30 are angled such that the non-reflective, non-illuminating surface 36 is directly visible in reflection via the vehicle 12, which can improve the ability of the scratch cameras 30 to detect scratches.

In the illustrated embodiment, the camera pairs are located between the non-reflective, non-illuminating surface 36 and the source 22 of structured light 24 and directed away from one another. However in other embodiments any suitable arrangement can be provided.

In use, the vehicle 12 enters the tunnel 16 via the entrance 18 and passes through the structured light portion 24 of the tunnel volume whilst the dent detecting cameras 24 image the striped lighting reflected. As the vehicle 12 continues to travel through the tunnel 16 it will pass through the non-structured light portion 32 of the tunnel volume. The non-structured light 32 is provided by the non-reflecting, non-illuminating surface 36 scattering the structured light 24. The non-structured light 32 serves as the light source for the scratch detecting cameras 30. The vehicle will continue to travel along the tunnel 16, being imaged by the two camera types 26, 30 until the vehicle 12 reaches the exit 20 and outer surfaces of the vehicle 12 have been captured by both dent and scratch detecting cameras 26, 30.

Figure 2:
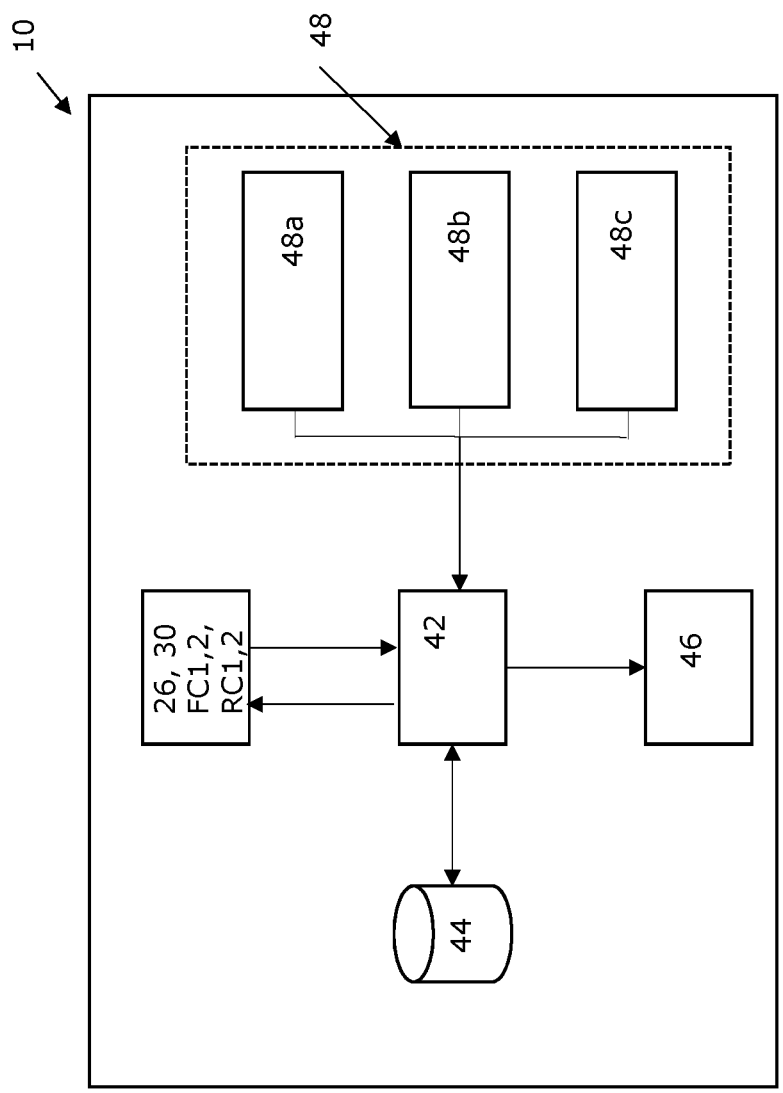
FIG. 2 is a system diagram of the controller of the imagining station of FIG. 1A.

Referring additionally to FIG. 2, the imaging station 10 can also be provided with a data processor or controller 42 such as a general purpose computer, application specific integrated circuit or the like, arranged to receive inputs from the cameras and store them in computer memory 44 and/or transmit them to a remote device 46.

The controller 42 can execute a program arranged to trigger the cameras 26, 30. The controller 42 can be arranged to trigger some of all of cameras 26, 30, FC1, FC2, RC1, RC2 in response to criteria such as input from one or more sensors 48 and/or temporal conditions having been met.

The imaging station can also be provided with one or more sensors 48 coupled to the controller. The imaging station 10 can for example comprise: a sound transducer 48a such as a microphone arranged to detect engine noise; a proximity sensor 48b arranged to detect a vehicle approaching the opening; and/or a vehicle speed sensor 48c that the controller 42 can use to synchronize cameras for stitching images together to form a continuous image of some or all of the vehicle or for adjusting camera settings such as shutter speed.

The controller 42 can execute a program to perform color matching to adjust camera settings for vehicle color. Color matching can comprise sampling the vehicle color either in the tunnel or outside via a camera. The image is then processed to determine the color of the vehicle. Depending on the color of the vehicle, all of the cameras inside the tunnel can be optimized in terms of color contrast and brightness for imaging a vehicle of the color. For example, if a white vehicle is being imaged by the system, a relatively large amount of structured light is reflected; however, for a black vehicle, a relatively small amount of structured light is reflected meaning that the images appears to be darker. The imaging station can therefore adjust the camera settings to allow for such variations in color.

An optional general light source 40 can be provided, such as a light box, in order to provide a general light source for the tunnel 16. Increasing the amount of light within the tunnel 16 is advantageous as it can reduce noise on the cameras, meaning that the cameras faster can be fired at a faster rate. A plurality of general light sources can be provided within the tunnel to illuminate various sides of the vehicle. However, any general light sources should not be directly visible in the field of view 26a, 30a of the scratch detecting cameras and dent detecting cameras when a vehicle is being imaged, particularly for the scratch detecting cameras 30.

Rear cameras RC1, RC2 can be provided at the entrance 18 of the tunnel and front cameras FC1, FC2 can be provided at the exit 20 of the tunnel 16 such that these cameras can capture images of the vehicle 12 as it enters and exits the tunnel volume.

Figure 3:
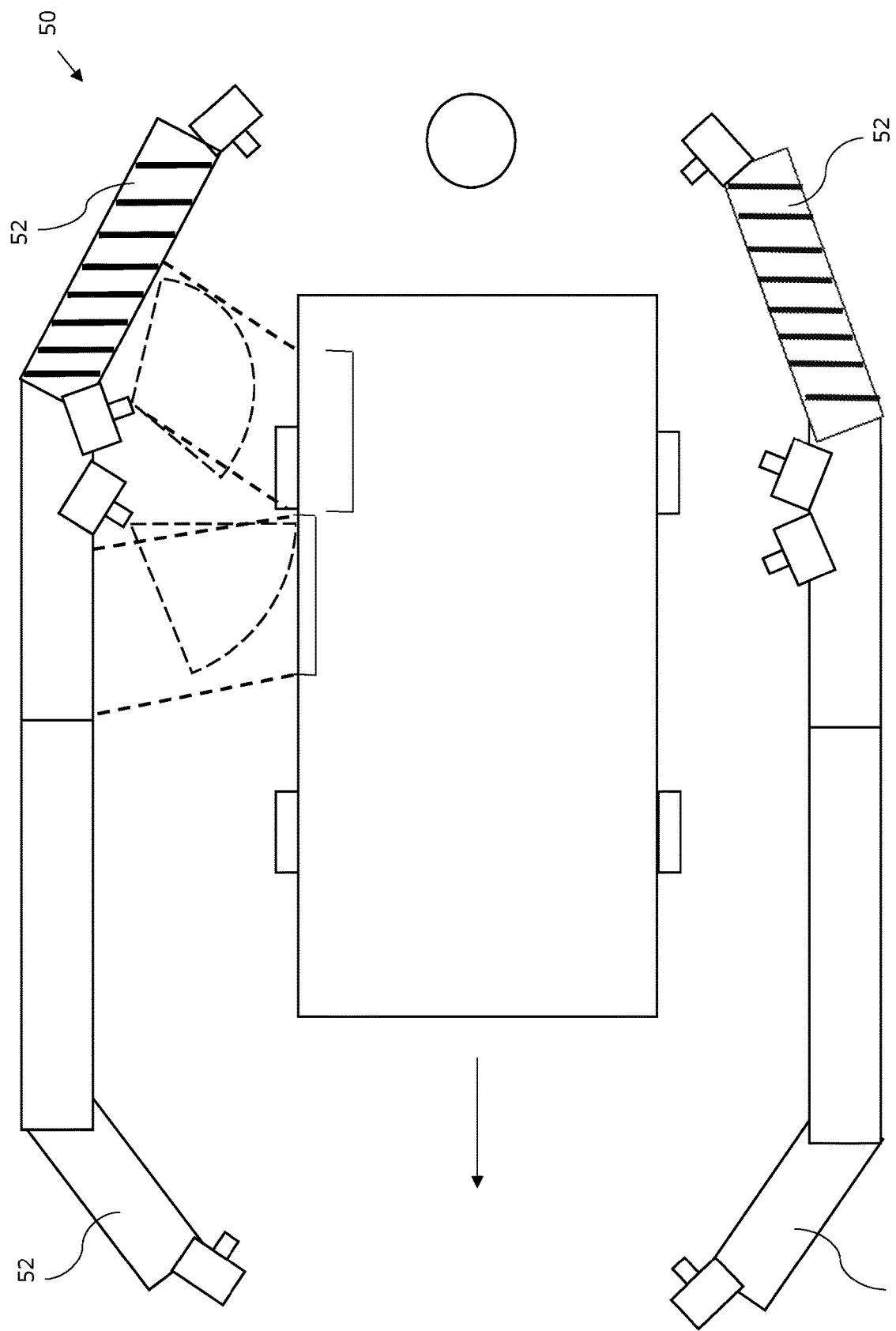
FIG. 3 is a diagram illustrating a vehicle imagining station according to a further embodiment of the invention.

FIG. 3 shows a vehicle imaging station 50 according to a further embodiment of the present invention. The vehicle imaging station 50 according to this embodiment is similar to the vehicle imaging station 10 according to the first embodiment and as such, for brevity, the following description will focus on the differences between them. Corresponding parts have been given the same reference numerals.

In this embodiment the tunnel 16 is defined by angled sections 52 closest to the entrance 18 and exit 20. These angled sections 52 can be arranged at 45° to the direction of travel of the vehicle D for example, or any other value that results in a narrowing, angled configuration. The inventor has found that this arrangement reduces the excess light originating from outside the tunnel 16 from entering the tunnel 16 thus producing more accurate and reliable images. As illustrated in FIG. 3, the striped lighting is located on the angled sections at the entrance, which can reduce the likelihood of a driver of the vehicle being dazzled by the structured lighting upon entering the tunnel 16.

In any embodiment the cameras can comprise scan cameras such as one or more Hikvisiion (RTM) MV-CA050-10GC area scan cameras.

In any embodiment the cameras can be fixed to tunnel and thus the cameras will take the shape of the inside of the tunnel. Alternatively, the cameras can be mounted on dedicated mounting structures.

The structured light source can be in the form of panels mounted on the tunnel side walls and/or roof, either freestanding or mounted separately to the tunnel wall.

The vehicle imaging station can comprise a unique identifier capture system (not shown) for capturing and processing one or more images of unique identifiers associated with vehicle being imaged by the apparatus. The system can for example be arranged to capture the vehicle number plate or chassis number as the vehicle passes through the tunnel.

Although the invention has been described above with reference to one or more embodiments, it will be appreciated that various changes or modifications can be made without departing from the scope of the invention as defined in the appended claims. Embodiments of the invention extend to an arrangement having fewer than four scratch detecting cameras, for example a single forward and rear facing camera, and the patterned portion does not need to be between the non-patterned portions. The word "comprising" can mean "including" and therefore does not exclude the presence of elements or steps other than those listed in any claim or the specification as a whole. The mere fact that certain measures are recited in mutually different dependent claims does not indicate that a combination of these measures cannot be used to advantage.

What is claimed is:

1. A vehicle imaging station for capturing images of scratches and dents on a vehicle, the vehicle imaging station comprising:
    a tunnel having an entrance and an exit with one or more walls defining an enclosure between the entrance and exit to define a tunnel volume containing a vehicle pathway having a central axis;
    a structured light source arranged to direct structured light at the vehicle pathway for illuminating a vehicle on the pathway with a structured light image, wherein the structured light image is a repeating pattern, and wherein the structured light source is mounted within the tunnel;
    a first camera arranged with a field of view comprising a structured light portion of the tunnel volume in which the structured light image will be reflected to be visible to the first camera by a vehicle moving along the vehicle pathway;
    a second camera arranged with a field of view comprising a non-structured light portion of the tunnel volume in which the structured light image will not be reflected to be visible to the second camera when a vehicle moves along the vehicle pathway; and
    a non-reflective, non-illuminating surface within the tunnel volume on a same side of the central axis of the vehicle pathway as the second camera, at least some of the non-reflective, non-illuminating surface being visible to the second camera in reflection via the vehicle when the vehicle is within the non-structured light portion of the tunnel volume.

2. A vehicle imaging station according to claim 1, wherein the second camera is orientated such that the structured light portion of the tunnel volume is not visible anywhere within the field of view of the second camera.

3. A vehicle imaging station according to claim 1, wherein the first and second cameras are arranged such that the field of view of the second camera does not overlap with the field of view of the first camera.

4. A vehicle imaging station according to claim 1, wherein the first and second cameras are mounted between the non-reflective, non-illuminating surface and the structured light source.

5. A vehicle imaging station according to claim 1, wherein the first camera is angled away from the second camera.

6. A vehicle imaging station according to claim 1, wherein the non-reflective, non-illuminating surface is a plain surface.

7. A vehicle imaging station according to claim 1, wherein the non-reflective, non-illuminating surface is planar.

8. A vehicle imaging station according to claim 1, wherein the first and second cameras define a first camera pair and the imaging station comprises one or more further camera pairs, at least one of which is mounted on the opposite side of the central axis of the vehicle pathway in comparison to the first pair
    wherein each first camera is arranged with a field of view comprising a structured light portion of the tunnel volume in which the structured light image will be reflected to be visible to the first camera by a vehicle moving along the vehicle pathway and each second camera is arranged with a field of view which includes a non-structured light portion of the tunnel volume in which the structured light image will not be reflected to be visible to the second camera when a vehicle moves along the vehicle pathway.

9. A vehicle imaging station according to claim 1, wherein the imaging station comprises one or more further cameras arranged to capture images of the front and/or rear of the vehicle, the underbody and/or the wheels or tires.

10. A vehicle imaging station according to claim 1, wherein the imaging station comprises a controller arranged to receive images from the cameras and store them in computer memory and/or transmit them to a remote device.

11. A vehicle imaging station according to claim 10, wherein the controller is arranged to execute a program arranged to trigger the cameras in response to criteria comprising input from one or more sensors and/or temporal conditions having been met.

12. A vehicle imaging station according to claim 10, comprising one or more sensors coupled to the controller.

13. A vehicle imaging station according to claim 12, wherein the sensors comprise: a sound transducer such as a microphone arranged to detect engine noise; a proximity sensor arranged to detect a vehicle approaching the opening; and/or a vehicle speed sensor that the controller can use to synchronize cameras for stitching images together to form a continuous image of some or all of the vehicle or for adjusting camera settings such as shutter speed.

14. A vehicle imaging station according to claim 10, wherein the controller is arranged to execute a program to perform color matching to adjust camera settings for vehicle color.

15. A vehicle imaging station according to claim 1, wherein the structured light source comprises panels mounted on or adjacent to the internal surface of the tunnel walls.

16. A vehicle imaging station according to claim 1, wherein the structured light source comprises a light array with LED strips arranged in parallel, and wherein the LED strips are mounted within the tunnel and define an interior surface of the tunnel.

17. A vehicle imaging station according to claim 1, wherein the repeating pattern is visible to the first camera when a vehicle is on the pathway.

18. A vehicle imaging station according to claim 1, wherein the repeating pattern comprises at least two light regions and two dark regions, each light region and dark region arranged in an alternating pattern and visible to the first camera when a vehicle is on the pathway.

19. A vehicle imaging station according to claim 1, wherein the repeating pattern comprises a series of stripes and is visible to the first camera when a vehicle is on the pathway.

20. A vehicle imaging station according to claim 1, wherein the structured light source is arranged to directly illuminate a vehicle on the vehicle pathway.

21. A vehicle imaging station according to claim 1, wherein the structured light source extends along a first portion of the tunnel and a non-structured light source extends along a second portion of the tunnel, and the first portion does not overlap the second portion.

22. A vehicle imaging station according to claim 1, wherein the structured light source does not extend fully along the tunnel.

* * * * *